Aug. 28, 1951 H. MACHANIC 2,565,820
DELIVERY CARRIER TRUCK
Filed March 17, 1950 2 Sheets-Sheet 1
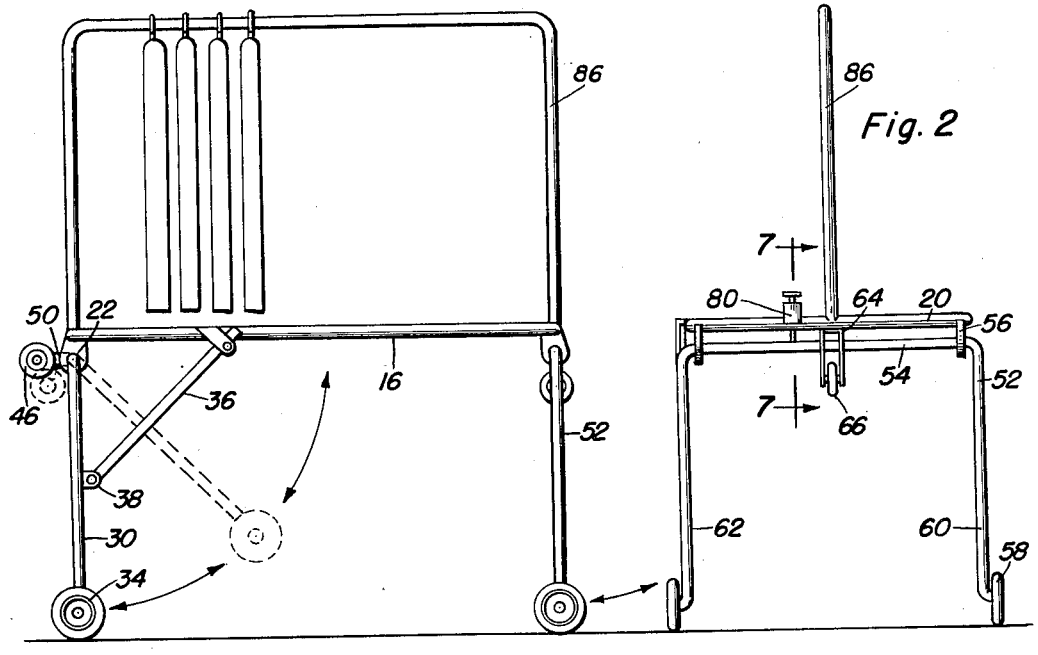
Fig. 1
Fig. 2
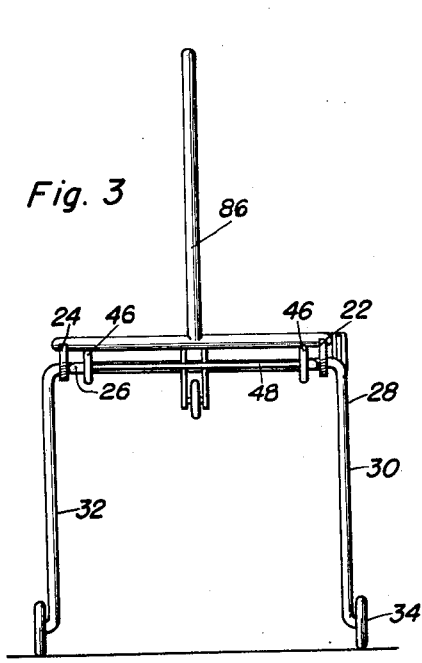
Fig. 3
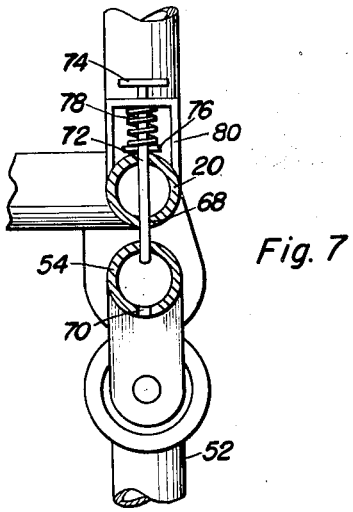
Fig. 7
Hermon Machanic
INVENTOR.
BY *Clarence A. O'Brien*
*and Harvey B. Jacobson*
Attorneys Aug. 28, 1951     H. MACHANIC     2,565,820
DELIVERY CARRIER TRUCK
Filed March 17, 1950     2 Sheets-Sheet 2
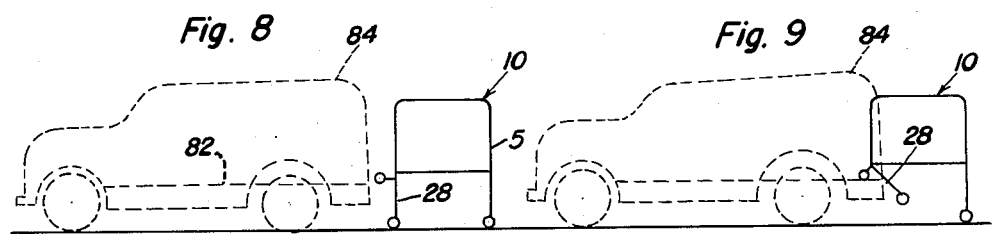
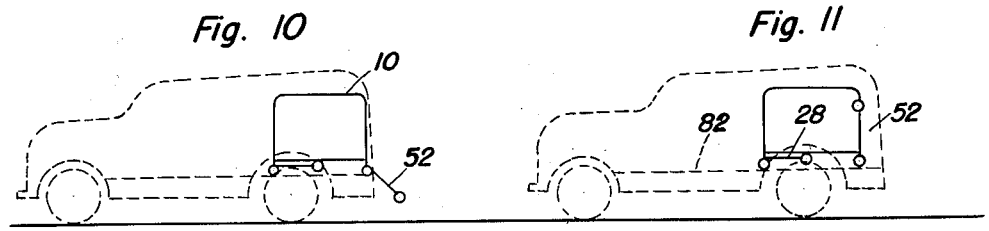
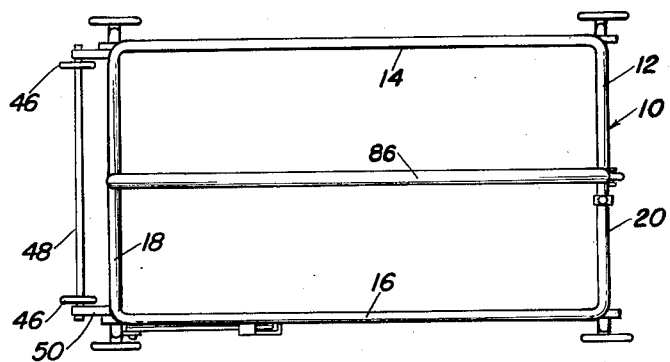
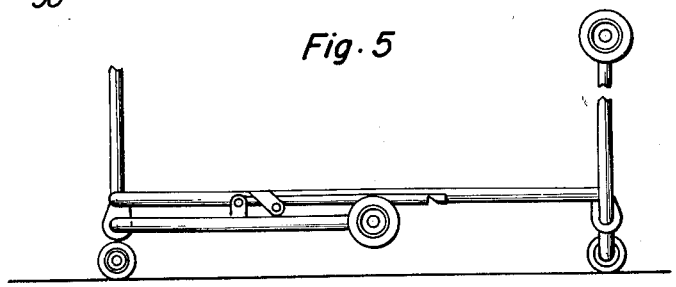
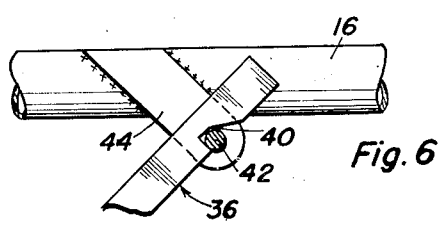
Hermon Machanic
INVENTOR.
BY *Clarence A. O'Brien*
*and Harvey B. Jacobson*
Attorneys Patented Aug. 28, 1951

2,565,820

UNITED STATES PATENT OFFICE 2,565,820

DELIVERY CARRIER TRUCK

Hermon Machanic, Burlington, Vt.

Application March 17, 1950, Serial No. 150,239

1 Claim. (Cl. 280—38)

This invention relates to a portable article carrier and particularly appertains to improvements in loading delivery trucks.

The primary object of this invention is to enable articles to be assembled for delivery purposes in a warehouse or similar station and to be loaded onto a delivery truck without being reassembled.

Another important object of this invention is to provide a collapsible portable carrier that can be loaded with articles in a warehouse and moved into a truck without necessitating any lifting of the carrier and rearranging or removal of the articles.

In delivering articles from a warehouse or the like, the articles are customarily loaded on a small hand truck or carrier which is manually pushed onto a loading platform. At that point, the articles are manually removed from the carrier and loaded onto a delivery vehicle. To obviate these various operations attendant with the loading of a delivery vehicle is the primary purpose of this invention, which provides a portable carrier, on which the articles are placed, the carrier then being bodily moved onto the delivery vehicle.

In carrying out this invention, a frame is provided and supporting legs are pivotally carried by the frame, the legs having wheels journalled on their lower ends for movably supporting the frame in a horizontal plane. The legs are movable from a depending position with respect to the frame to a collapsed position and the frame can thus be lowered with means being provided for moving the frame in its lowered position. The frame is loaded with articles and moved by means of the wheel mounted legs to the delivery vehicle and the front legs are then swung upwardly. The lower portion of the frame lies in the same plane, as the floor of the delivery vehicle and, when the front legs are collapsed, the frame is moved into the truck and wheels carried by the frame ride on the floor of the vehicle. The back legs are then swung upwardly and locked to the frame and the frame is simply moved forward into the truck. The entire loading operation is easily carried out by one man and no interruption to the forward movement of the carrier relative to and into the vehicle is necessitated.

The foregoing and ancillary objects are attained by this invention, the preferred embodiment of which is set forth in the following description and illustrated in the accompanying drawings, wherein:

Figure 1 is a side elevational view of the carrier;
Figure 2 is a rear elevational view thereof;
Figure 3 is a front elevational view;
Figure 4 is a top plan view;
Figure 5 is a side elevational view of the carrier in a collapsed position;
Figure 6 is an enlarged fragmentary view of the locking means for the front legs;
Figure 7 is a sectional view taken on line 7—7 of Figure 2; and,
Figures 8 to 11 are diagrammatic views of the carrier showing the carrier in use.

The carrier 10 includes a unitary horizontal open frame 12, which is formed from light weight tubular material and is preferably rectangular. The frame consists of parallel sides 14 and 16 connected by end members 18 and 20. A pair of apertured bearing ears 22 and 24 depend from the opposing ends of the front end member 18 and the web portion 26 of a U-shaped member 28 is journalled therein. The legs 30 and 32 of the U-shaped member 28 form the front legs or standards for the carrier and are, therefor, provided at their outer unattached or lower ends with wheels 34 journalled thereon. The U-shaped member 28 is rotatably journalled in the ears and means is provided for locking the member to the frame so that the legs are held rigid in a lowered or depending position. The locking means includes an arm pivotally affixed at one end to an apertured ear 38 laterally projecting from the leg 30. A notch 40 is formed in the opposing end of the arm and is lockingly engageable on a pin 42 transversely carried by a bracket 44 welded or otherwise secured in a depending manner to the side 16.

When the legs 30 and 32 are swung upwardly, after release of the locking means 36, means is provided for moving the frame and includes ground engaging wheels 46 journalled on an axle 48 mounted in projections 50 laterally extending from the ends of the web portion and positioned forwardly of the frame.

A U-shaped member 52 has the web portion 54 thereof rotatably journalled in apertured bearing brackets or ears 56 depending from the rear end 20 of the frame 12. Wheels 58 are journalled on the ends of the legs 60 and 62. A depending U-shaped bracket 64 is carried by the center of the rear end 20 of the frame and a wheel 66 is journalled therein, the wheel being in the same plane as the wheels 34 when the front member 28 is rotated into a collapsed position.

Means is provided for locking the member 52 in raised or lowered positions and includes a vertical opening 68 formed in the end 20 and a registerable transverse opening 70 formed in the web portion 54. A locking pin 72 is mounted in the opening 68 and is formed with a transverse head 74. A stop 76 is formed on the pin and is parallel to and spaced from the head with a spring 78 concentrically positioned on the pin between the top of casing 80 and the stop to urge the pin into the opening 70. The spring 78 is housed in vertical casing 80 fixed on the end 20 of the frame.

In use, as seen in Figures 8 through 11, the carrier is moved on the depending front and rear members 28 and 52, which have their legs locked in depending positions. The frame 12 is on a plane slightly above the floor 82 of the delivery truck 84 and, as the front member approaches the rear end of the floor, the locking arm 36 is manually released. The wheels 46 are then brought into engagement with the floor of the truck and the carrier is wheeled into the truck. The rear member is then unlocked and swung upwardly to a vertical position in which it is automatically locked by the pin 72.

For the purpose of using the carrier as a garment carrier, a vertical U-shaped tubular frame 86 is mounted on the ends of the frame 12, the horizontal web of the frame 86 receiving the hangers for the garments. Of course, any type of article supporting means or frame can be mounted on the frame 12 and the frame 12 may be designed and formed of any desired shape.

However, since many other modifications and purposes of this invention will become readily apparent to those skilled in the art upon a perusal of the foregoing description, it is to be understood that certain changes in style, size and components may be effected without a departure from the spirit of the invention and within the scope of the appended claim.

Having described the invention, what is claimed as new is:

A portable carrier comprising a horizontal frame, a U-shaped member having a web portion rotatably journaled on the front end of said frame, wheels journaled on the free ends of the leg portions of said U-shaped member, lateral forwardly extending projections shorter in length than said leg portions and carried by said web portion, wheels journaled on said projections, means for releasably locking said leg portions in a depending position, a wheeled frame rotatably journaled on the rear end of said horizontal frame, latch means for lockingly retaining said wheeled frame in selected raised and lowered positions, a depending bracket secured to the rear end of said horizontal frame and of a length equal substantially to that of said lateral projections, and a ground-engaging wheel journaled in said bracket.

HERMON MACHANIC.

REFERENCES CITED

The following references are of record in the file of this patent:

UNITED STATES PATENTS

| Number | Name | Date |
| --- | --- | --- |
| 1,742,309 | Flanagan | Jan. 7, 1930 |